US008621631B2

(12) United States Patent
Koelle et al.

(10) Patent No.: US 8,621,631 B2
(45) Date of Patent: *Dec. 31, 2013

(54) METHOD FOR EVOLVING DETECTORS TO DETECT MALIGN BEHAVIOR IN AN ARTIFICIAL IMMUNE SYSTEM

(75) Inventors: Katharina Veronika Koelle, Durham, NC (US); Wendy Midwinter, Toronto (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,102

(22) Filed: Nov. 22, 2011
(Under 37 CFR 1.47)

(65) Prior Publication Data

US 2012/0072987 A1    Mar. 22, 2012

Related U.S. Application Data

(63) Continuation of application No. 11/532,855, filed on Sep. 18, 2006, now Pat. No. 8,065,733.

(60) Provisional application No. 60/720,255, filed on Sep. 23, 2005.

(51) Int. Cl.
*G06F 11/00* (2006.01)

(52) U.S. Cl.
USPC .................... 726/23; 726/22; 726/24; 726/25

(58) Field of Classification Search
USPC .......................................... 726/23, 22, 24, 25
See application file for complete search history.

(56) References Cited

U.S. PATENT DOCUMENTS

| 4,535,355 A | 8/1985 | Arn et al. |
| 4,694,489 A | 9/1987 | Frederiksen |

(Continued)

FOREIGN PATENT DOCUMENTS

| EP | 658054 B1 | 6/1995 |
| EP | 714204 B1 | 5/1996 |

(Continued)

OTHER PUBLICATIONS

Wu, T.-L. et al., "Selective Encryption and Watermarking of MPEG Video (Extended Abstract)," International Conference on Image Science, Systems, and Technology, Feb. 17, 1997, 10 pages.

(Continued)

*Primary Examiner* — Teshome Hailu
(74) *Attorney, Agent, or Firm* — Frommer Lawrence & Haug LLP; John W. Branch

(57) ABSTRACT

A system, apparatus, and method are directed to evolving detectors in an Artificial Immune System for use in detecting unauthorized computing activities. In one embodiment, a population of detectors is generated with a matching value and expectation value of zero. The detectors are then compared to logged fragments of system calls within a computing device to modify the matching value. When the matching value for a given detector is equal to or greater than an expectation value, the detector's expectation value may be set to the matching value. The detectors may then evolve and/or generate other detectors using mutation, and/or recombination, or the like. Detectors continue to generate and/or to evolve until a detector's matching value reaches a determined value, in which case, the detector may be evaluated to determine if an unauthorized activity is detected. If an unauthorized activity is detected, a detection response may be performed.

15 Claims, 8 Drawing Sheets

(56) References Cited

U.S. PATENT DOCUMENTS

| | | | |
|---|---|---|---|
| 5,067,035 A | 11/1991 | Kudelski et al. | |
| 5,134,656 A | 7/1992 | Kudelski | |
| 5,144,663 A | 9/1992 | Kudelski et al. | |
| 5,319,638 A | 6/1994 | Lin | |
| 5,375,168 A | 12/1994 | Kudelski | |
| 5,539,450 A | 7/1996 | Handelman | |
| 5,590,200 A * | 12/1996 | Nachman et al. | 380/46 |
| 5,592,212 A | 1/1997 | Handelman | |
| 5,621,799 A | 4/1997 | Katta et al. | |
| 5,640,456 A * | 6/1997 | Adams et al. | 713/153 |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,825,879 A | 10/1998 | Davis | |
| 5,825,890 A | 10/1998 | Elgamal et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,937,159 A | 8/1999 | Meyers et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,953,005 A | 9/1999 | Liu | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,052,785 A | 4/2000 | Lin et al. | |
| 6,055,503 A | 4/2000 | Horstmann | |
| 6,061,454 A | 5/2000 | Malik et al. | |
| 6,073,256 A | 6/2000 | Sesma | |
| 6,112,181 A | 8/2000 | Shear et al. | |
| 6,119,165 A | 9/2000 | Li et al. | |
| 6,138,119 A | 10/2000 | Hall et al. | |
| 6,151,643 A | 11/2000 | Cheng et al. | |
| 6,157,721 A | 12/2000 | Shear et al. | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,192,354 B1 | 2/2001 | Bigus et al. | |
| 6,201,948 B1 | 3/2001 | Cook et al. | |
| 6,223,287 B1 | 4/2001 | Douglas et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,314,409 B2 | 11/2001 | Schneck et al. | |
| 6,314,572 B1 | 11/2001 | LaRocca et al. | |
| 6,330,588 B1 | 12/2001 | Freeman | |
| 6,334,213 B1 | 12/2001 | Li | |
| 6,363,488 B1 | 3/2002 | Ginter et al. | |
| 6,367,009 B1 | 4/2002 | Davis et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,584,567 B1 | 6/2003 | Bellwood et al. | |
| 6,587,561 B1 | 7/2003 | Sered et al. | |
| 6,618,484 B1 | 9/2003 | Van Wie et al. | |
| 6,629,243 B1 | 9/2003 | Kleinman et al. | |
| 6,634,028 B2 | 10/2003 | Handelman | |
| 6,640,304 B2 | 10/2003 | Ginter et al. | |
| 6,643,701 B1 | 11/2003 | Aziz et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,671,812 B1 | 12/2003 | Balasubramaniam et al. | |
| 6,674,717 B1 | 1/2004 | Duong-van et al. | |
| 6,681,327 B1 | 1/2004 | Jardin | |
| 6,718,388 B1 | 4/2004 | Yarborough et al. | |
| 7,150,045 B2 * | 12/2006 | Koelle et al. | 726/26 |
| 8,065,733 B2 | 11/2011 | Koelle et al. | |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0059078 A1 * | 5/2002 | Valdes et al. | 705/1 |
| 2002/0087883 A1 | 7/2002 | Wohlgemuth et al. | |
| 2002/0089410 A1 | 7/2002 | Janiak et al. | |
| 2002/0104004 A1 | 8/2002 | Couillard | |
| 2002/0141582 A1 | 10/2002 | Kocher et al. | |
| 2002/0164023 A1 * | 11/2002 | Koelle et al. | 380/201 |
| 2003/0007568 A1 | 1/2003 | Hamery et al. | |
| 2005/0038818 A1 | 2/2005 | Hooks | |
| 2005/0063303 A1 | 3/2005 | Samuels et al. | |
| 2005/0074007 A1 | 4/2005 | Samuels et al. | |
| 2005/0108420 A1 | 5/2005 | Brown et al. | |
| 2005/0187979 A1 | 8/2005 | Christensen et al. | |

FOREIGN PATENT DOCUMENTS

| | | |
|---|---|---|
| EP | 0886409 | 12/1998 |
| EP | 1041823 A2 | 10/2000 |
| WO | 96/06504 A1 | 2/1996 |
| WO | 96/32702 A1 | 10/1996 |
| WO | 99/30499 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |

OTHER PUBLICATIONS

"Estabilishing Interconnectivity Among Various Makers' Products Through Standardization of VOD Protocol," NTT Corporation Press Release, Sep. 27, 2002 http://www.ntt.co.jp/news/news02e/0209/020927.html.

Bathrop, J. et al., "Coverage and Generalization in an Artificial Immune System," Proceedings of Genetic and Evolutionary Computation Conference (GECCO), 2002, pp. 1-8.

Griwodz, C., "Video Protection by Partial Content Corruption," Multimedia and Security Workshop at ACM Multimedia, Bristol, UK, Sep. 1998, pp. 1-5.

Eskiciouglu, A. et al., "An Overview of Multimedia Content Protection in Consumer Electronics Devices," SP:IC, 16 (7), Apr. 2001, pp. 681-699.

Spanos, G. et al., "Performance Study of a Selective Encryption Scheme for the Security of Networked, Real-Time Video," Proceedings of the 4th ICCN, Las Vegas, NV, Sep. 1995, pp. 2-10.

(56) References Cited

OTHER PUBLICATIONS

"Intelligent Systems for Finance and Business," Goonatilake, Suran, ed. et al., 1995, Chapters 2-10, pp. 31-173.
"Irdeto Access & Optibase Create Strategic Alliance," Press Release, Optibase, Dec. 14, 2000, pp. 1-4 http://www.irdetoaccess.com/press/0000041.htm.
Blumenfeld, S., "System Security, Streaming Media," Broadcast Engineering Magazine, Oct. 2001, pp. 1-2.
Forrest, S., "Research Projects," Dec. 2, 2003, pp. 1-3 http://www.cs.unm.edu/~forrest/projects.
Cheng, H.C.H., "Partial Encryption for Image and Video Communication," Department of Computing Science, University of Alberta, Fall 1998, pp. 1-87.
Hunter, J. et al., "A Review of Video Streaming Over the Internet," DSTC Technical Report TR97-10, Aug. 1007, pp. 1-28.
Schulzrinne, H. et al., "Real Time Streaming Protocol (RTSP)," RFC 2326, Apr. 1998, pp. 1-86.
"Irdeto Access & Optibase Create Strategic Alliance," Press Release, Optibase, Dec. 14, 2000, pp. 1-2 http://www.optibase.com/html/news/December_14_2000.html.
Omneon Video Networks Product Announcement, "Broadband Streaming Omneon and BSkyB," TB-1006-1, created 2002, pp. 1-4.
Yoshida, K. et al., "A Continuous-media Communication Method for Minimizing Playback Interruptions," IS&T/SPIE Conference on visual communications and Image Processing, San Jose, California, Jan. 1999, vol. 3653.
Ghosh, A. K. et al., "Execution Control Lists: An Approach to Defending Against New and Unknown Malicious Software," Citigal, 2000, entire document http://www.citigal.com/[papers/download/ISW00.pdf.
"Directed-Graph Epidemiological Models of Computer Viruses," Kephart and White, 1991 IEEE Computer Society Symposium of Research in Security and Privacy, Oakland, California, May 20-22, 1991, pp. 343-359.
"Computers and Epidemiology," Kephart, Chess, and White, IEEE Spectrum, May 1993, 15 pages.
"A Biologically Inspired Immune System for Computers," Kephart, Artificial Life IV, R. Brooks and P. Maes, eds., 1994, MIT Press, pp. 1-10.
"Self-Nonself Discrimination in a Computer," 1994 IEEE Symposium on Research in Security and Privacy, 11 pages.
"An Immunological Approach to Change Detection: Algorithms, Analysis and Implications," 1996 IEEE Symposium on Security and Privacy, 10 pages.
"A Sense of Self for Unix Processes," Forrest, Hofmeyr, Somayaji, and Longstaff, 1996 IEEE Symposium on Security and Privacy, Los Alamitos, CA, IEEEE Computer Society Press, pp. 120-128.
"Lightweight Intrusion Detection for Networked Operating Systems," Hofmeyr, Forrest and Somayaji, 1998, pp. 1-31.
"Principles of a Computer Immune System," Somayaji, Hofmeyr and Forrest, New Security Paradigms Workshop, Langdale, Cumbria, UK, 1997, pp. 75-82.
"A Distributed Approach to Anomaly Detection," D'haeseleer, Forrest and Heiman, Draft, Aug. 30, 1997, pp. 1-30.
"Blueprint for a Computer Immune System," Kephart, Sorkin, Swimmer and White, Virus Bulletin International Conference in San Francisco, CA, Oct. 1-3, 1997, 19 pages.
"Architecture for an artificial immune System," Hofmeyr and Forrest, Evolutionary Computation 7(1):45-68, Massachusetts Institute of Technology, 31 pages.
"Immunity by Design: An Artificial Immune System," Hofmeyr and Forrest, Proceedings of the Genetic and Evolutionary Computation Conference (GECCO), Morgan-Kaufmann, San Fancisco, CA, 1999, pp. 1289-1296.
"Detecting Intrusions Using System Calls: Alternative Data Models," Warrender, Forrest and Pearlmutter, 1999 IEEE Symposium on Security and Privacy, May 9-12, 1999, 13 pages.
"A New Approach for Intrusion Detection," Dasgupta and Gonzalez, 2001, pp. 1-12.
International Search Report and Written Opinion for International Patent Application No. PCT/US2006/036934 mailed Sep. 20, 2007.
International Preliminary Report on Patentability for International Patent Application No. PCT/US2006/036934 mailed Mar. 26, 2008.
Official Communication for U.S. Appl. No. 11/532,855 mailed Aug. 17, 2010.
Official Communication for U.S. Appl. No. 11/532,855 mailed Jan. 27, 2011.
Official Communication for U.S. Appl. No. 11/532,855 mailed Apr. 11, 2011.
Official Communication for U.S. Appl. No. 11/532,855 mailed Jul. 8, 2011.

* cited by examiner

METHOD FOR EVOLVING DETECTORS TO DETECT MALIGN BEHAVIOR IN AN ARTIFICIAL IMMUNE SYSTEM

CROSS-REFERENCE TO RELATED APPLICATIONS

This is a continuation application that claims the benefit of provisional application Ser. No. 60/720,255 entitled "Method For Evolving Detectors To Detect Malign Behavior In An Artificial Immune System," filed on Sep. 23, 2005, and further claims the benefit of utility U.S. Pat. No. 8,065,733, entitled "Method For Evolving Detectors To Detect Malign Behavior In An Artificial Immune System," which issued on Nov. 22, 2011, wherein the benefit of the earlier filing dates of the provisional application and the patent are hereby claimed under 35 U.S.C. §119 (e) and §120 and 37 C.F.R. §1.78, and which are further incorporated by reference.

FIELD OF THE INVENTION

This invention relates generally to computing security, and more particularly but not exclusively, to evolving fragments of computer file system calls (known as detectors) in an Artificial Immune System (AIS) for use in detecting unauthorized computing activities.

BACKGROUND OF THE INVENTION

Over the last several decades, many anti-virus (anti-worm, anti-Trojan horse) technologies have been developed and brought to market. Most of these technologies are traditional in that new virus, worm, or Trojan horse signatures need to be manually identified and appended to a list. The resultant consumer software then also needs to be, updated with these new signatures on a regular basis in order to protect the consumer's computer from the newest computer pathogens.

A more recent development in antiviral technology has been the idea of an Artificial Immune System (AIS). Artificial Immune Systems have the potential to provide adaptive solutions to the ever-increasingly severe problem of large-scale computer attacks. The central idea behind anti-virus AIS is the establishment of a defined 'normal' behavior of a computer's processes. This 'normal' behavior is considered the 'self' in the biological metaphor, whereas a deviation from this normal behavior is considered 'non-self' and potentially harmful to the system. Regardless of the new viruses that may be developed and targeted at a computer running an AIS, the AIS should be able to detect the abnormal functioning of its processes and signal an alert. Compared to a traditional signature-logging anti-virus technology, AISs provide an adaptive solution to the computer virus problem. By making the technology adaptive, AISs are simpler and more elegant than the traditional anti-virus solutions.

Whatever the application of the specific AIS, a recurring problem is the tradeoff between speed and thoroughness. If speed is crucial, the algorithm may often be designed to be less thorough, which may then lead to a decreased detection rate and/or an increase in false positives. If thoroughness is the priority, then the algorithm that is designed may result in running more slowly, which in turn may be so slowly that the detection of a malign intrusion or other unauthorized activity may be too late to prevent the behavior. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE PREFERRED EMBODIMENT

Figure 1:
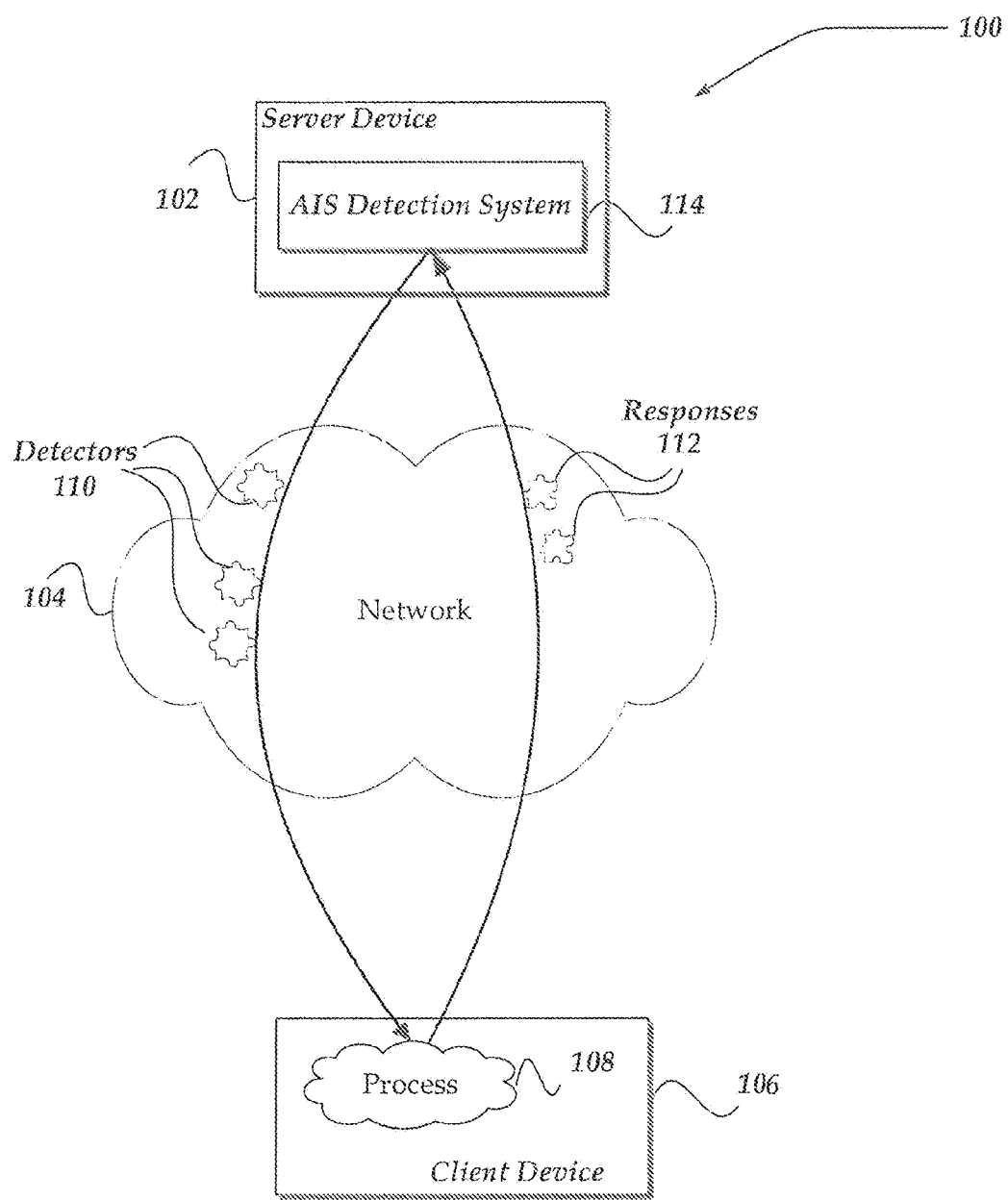
FIG. 1 shows a functional block diagram illustrating one embodiment of an operating environment with server creation of static detectors.

In the following detailed description of exemplary embodiments of the invention, reference is made to the accompanying drawings, which form a part hereof, and which show, by way of illustration, specific exemplary embodiments by which the invention may be practiced. Each embodiment is described in sufficient detail to enable those skilled in the art to practice the invention, and it is to be understood that other embodiments may be utilized, and other changes may be made, without departing from the spirit or scope of the invention. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, a system, apparatus, and method are directed to evolving detectors in an Artificial Immune System (AIS) for detecting unauthorized computing activities. The detectors evolve using a genetic algorithm that is configured to generate other detectors using mutation and/or recombination of parent detectors. In one embodiment, a population of detectors is generated. In one embodiment, each detector may be assigned a matching value of zero, and an expectation value of zero. The detectors are then compared to logged fragments of system calls within a computing device to modify their matching value. When the matching value for a given detector is equal to or greater than an expectation value, the detector's expectation value may be set to the matching value. The detectors are ranked based on how they satisfy a fitness function. In one embodiment, the detectors may be ranked according to their expectation values. The detectors may then generate other detectors using mutation, and/or recombination, or the like, based, in part, on how well the detectors satisfy the fitness function. In one embodiment, the number of detectors generated may be proportional to their matching value. The other detectors, when generated and/or evolved, may be given an initial matching value of zero, and an expectation value based on that of their parents. Detectors continue to generate and/or evolve until a detector's matching value reaches a threshold value, in which case, in one embodiment, the detector may be sent to a server, where it is evaluated to determine if an unauthorized activity is detected.

Description of an Artificial Immune System (AIS)

AISs are typically premised on the concept that both vertebrates and computers are bombarded with a variety of changing foreign matter against which they must defend themselves. In the case of vertebrates, there is a dynamic repertoire of viruses, bacteria, and other pathogens that evolve through a process of natural selection. In the case of computers, there are many artificial 'pathogens' (such as viruses, worms, and Trojan horses) that are continuously generated and may spread from one computer to another, leaving a trail of 'infections' that potentially cause applications to function abnormally and computers to crash. In the case of vertebrates, a natural immune system evolved whose primary strength is the ability to recognize novel as well as recurrent pathogens. Natural immune systems accomplish this recognition feat by generating an idea of protein 'self' in the thymus. All protein fragments that fall outside of this normal constitution are considered non-self and therefore potentially harmful to the body. Artificial Immune Systems including computing systems that may be designed to be similar to natural immune systems in that they have a definition of 'self'; however, one difference is that AISs establish 'self' through a normal process behavior (usually defined by short sequences of system calls), whereas natural immune systems establish 'self' through protein fragment identity.

Illustrative Operating Environment

FIG. 1 shows a functional block diagram illustrating one embodiment of an environment in which an AIS may be employed. However, not all of these components may be required to practice the invention, and variations in the arrangement and type of the components may be made without departing from the spirit or scope of the invention.

As shown in FIG. 1, system 100 is configured to enable a server to detect unauthorized or malign software behavior on a client. Thus, as shown, system 100 includes server device 102, network 104, client device 106, detectors 110, and responses 112. Server device 102 includes AIS detection system 114. Client device 106 includes software process 108. Network 104 is coupled to and enables communication between client device 106 and server device 102.

Generally, client device 106 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 106 may also include other computing devices, such as personal computers, multiprocessor systems, microprocessor-based or programmable consumer electronics, network devices, and the like. As such, client device 106 may range widely in terms of capabilities and features. For example, a client device configured as a cell phone may have a numeric keypad and a few lines of monochrome LCD display on which only text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client device 106 also may include at least one client application that is configured to receive content from another computing device. The client application may include a capability to provide and receive textual content, graphical content, audio content, alerts, messages, and the like. Moreover, client device 106 may be further configured to communicate a message, such as through a Short Message Service (SMS), Multimedia Message Service (MMS), instant messaging (IM), interne relay chat (IRC), mIRC, Jabber, and the like, between another computing device, and the like.

Client device 106 may also include virtually any process, including a client application, operating system, component of an operating system, or the like, useable to perform a variety of other actions. Thus, as shown, process 108 may represent virtually any software process within client device 106. In at least one embodiment, at least one of the processes may be evaluated using an AIS by sending detectors 110 to client device 106. In one embodiment, detectors 110 may be sent by AIS detection system 114. Moreover, based on a comparison of sequences of different types of computer system calls, responses 112 may be formed and sent to over network 104 to server device 102. Such sequences of different types of computer system calls may be generated, in one embodiment, based on actions performed by the process under evaluation.

In one embodiment, client device 106 may be configured such that an end-user may operate the computing device to make requests for data and/or services from other computers on the network. In one embodiment, client device 106 may employ a network interface unit (sometimes called a transceiver), such as described below, to communicate information with another computing device.

Often, the requested data resides in computing devices such as a server, or the like. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client device 106 is a computing device that is not operated by an end-user.

Network 104 is configured to couple one network device with other network devices. Network 104 is enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks may enable wide area coverage for network devices, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 104 includes any communication method by which information may travel between one network device and another network device.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

In one embodiment, server device 102 may provide access to information, such as streaming media, and services through network 104 to client device 106. In one embodiment, while client device 106 may be receiving information from server device 102, server device 102 may also transmit through network 104 a series of detector 110 to client device 106. In response, client device 106 may provide responses 112 to detectors 110 through network 104 for evaluation by AIS detection unit 114. The communication of detectors 110 and responses 112 between client device 106 and server device 102 may occur with or without the user's knowledge for client device 106.

In another embodiment, server device 102 may be configured to provide detectors 110 and receive responses 112 independent of whether additional information is provided to client device 106. Moreover, server device 102 may represent a plurality of servers, wherein one of the servers may provide information, such as media, or the like, while another of the servers may provide and/or receive detector 110 and/or responses 112.

Regardless of whether server device 102 is actively providing non-AIS services to client device 106, it may be transmitting a series of detectors 110 to software process 108 through network 104. Client device 106 communicates responses 112 to one or more detectors 110 through network 104 for evaluation by AIS detection system 114.

In another embodiment, instead of, or in addition to receiving detectors 110 from server device 102, an application may also reside on client device 106 that is configured to generate the detectors 110, and then communicate the responses 112 of the audited process to the AIS detection system 114, regardless of its exact location.

As shown, server device 102 includes AIS detection system 114, which is configured to provide detectors 110 and to evaluate responses 112. In one embodiment, AIS detection system 114 may separate the responses into adequate or inadequate categories of responses, any of a variety of other categories. Then, based on the responses 112 AIS detection system 114 may signal an alert if the number of inadequate responses become too high. In another embodiment, AIS detection system 114 may perform any of a variety of other actions, based on detecting unauthorized behavior in client device 106, including, but not limited to, inhibiting further transmission of information to client device 106, providing information to client device 106 that may terminate or otherwise incapacitate process 108, providing information about client device 106 and/or process 108 to an agency, or business, or the like.

Devices that may operate as server devices 110-113 include personal computers, desktop computers, multiprocessor systems, microprocessor-based or programmable consumer electronics, network PCs, servers, and the like.

Figure 2:
FIG. 2 shows a diagram illustrating one embodiment of a possible detector type.

FIG. 2 is a diagram illustrating one embodiment of a possible detector 110 employed in an AIS, such as shown in FIG. 1. Detector 110 represents a fragment (sequence) of computer file system calls, which can be either exactly or partially matched by a currently running software process's audited file system calls, as a function of a given set of matching rules. Moreover, the sequence of system calls may include of any length of or number of calls that comprise detector 110. Thus, detector 110 of FIG. 2 is not intended to limit contents, lengths, or other aspects of detectors. For example, in one embodiment, detector 110 may include a name field that uniquely identifies a process being evaluated, a time stamp indicating when a detector how long a detector may live before it is terminated, or the like.

Responses 112 illustrated in FIG. 1 can be substantially similar to detectors 110 structures, in that responses 112 may be fragments (sequences) of system calls that are matched by the detectors 110 when compared to the audited process log. Responses 112 may, in one embodiment, be sequences of system calls that are based, in part, on actions performed by a process being evaluated. In one embodiment, the sequence of system calls may be converted into a sequence of Booleans based on a determined algorithm. Moreover, in one embodiment, responses 112 may be a detector 110 that is provided for evaluation.

In another embodiment, the sequence calls are numerically encoded and combined into a number. Encoding the sequence calls is directed at obscuring the meaning of detector 110 and/or responses 112 further, as the number may have different meanings based on the algorithm employed to encode the sequence, thus making it more difficult for a client side user to determine how the invention functions.

Encoding schemes for the sequence calls may be implemented in a variety of ways depending upon the number of system calls in a given sequence, the format of the detector rules, and the like. For example, a generic hashing function may be employed to encode the system calls within detector 110 and/or responses 112, without departing from the scope or spirit of the present invention.

In one embodiment, there are two categories of detector 110. The first category of detector 110 is called self-detectors. Self-detectors include system call fragments that are typically located in a saturated self-database, i.e., a database that includes a set of possible sequences of system calls seen in a normal execution of software process 108. In one embodiment, if a common self-detector is employed as a "behavioral question" to client software process 108 running on client device 106, client software process 108 may provide a response that indicates an acknowledgment that the self-detector has been found in its audit log (not shown).

The second category of detector 110 is called non-self detectors, and includes sets of sequences of system calls that are not seen in the normal execution of software process 108. This might include those non-self sequences representing abnormal behaviors, corrupted processes, unauthorized behaviors, or the like. As shown in FIG. 1, AIS detection system 114 may generate self-detectors and/or non-self detectors.

Operationally, server device 102 of FIG. 1 may provide detectors 110 to client device 106 over network 104. Positive or negative responses 112 in turn are communicated to server device 102, depending on whether the detectors have been matched by the audited system call fragments of software process 108 on client device 106. The AIS detection system 114 on server device 102 evaluates the client's responses 112 to determine whether the client's software process 108's actions may be unauthorized.

The above description is one of many embodiments of an AIS. As described so far, however, many of these AISs might have to provide a large number of detectors to determine whether actions of the process under evaluation are unauthorized. This issue may be understood by way of a feasible example.

Let the size of a typical saturated self-database be approximately 10,000 unique length-10 file system call fragments. The size of the non-self database would therefore be approximately 10,239,999,990,000 unique length-10 file system call fragments, given an alphabet size of 20 file system calls. For the above AIS detection system 114 to detect abnormal (malign or unauthorized) behavior of software process 108, the system can perform either: (a) a comparison of file system call fragments from the audited software process to an entire self-database of about 10,000 in size to determine which, and how many of the fragments are non-self, or (b) a comparison of file system call fragments from the audited software process to a fraction of the non-self fragments from the non-self database of size 10,239,999,990,000 to determine which, and how many of the audited fragments fall under the non-self category. The larger this fraction, the more likely it is for a malign or unauthorized process to be identified, but the slower and more processor-intensive the algorithm will likely be on the client-side.

Whether logged data fragments are compared to the self or non-self database, either of these databases may be compressed to a smaller size using 'rules'. For example, a fragment with a 9-system-call matching rule such as '3-12-2-6-7-*-3-1-9-11' (where * is any of the numbers representing a possible file system call) might enable the compression of up to 20 individual file system call fragments, given that there are 20 different file system calls in the database (e.g., the alphabet). Similarly, a rule with 2*'s might compress up to 400 fragments into one rule fragment, thus reducing the number of detectors sent to the client. However, these rules usually also expand the self-space to cover some non-self space, reducing the ability to detect some malignly acting software processes.

Another compression or 'chunking' algorithm may be employed either for compressing self or non-self space. With the chunking algorithm, non-self space may be covered with detectors of different chunking sizes. For example, if self space includes no file system calls fragments that have the file system call numerically identified as 15 in them, then a detector of length 1 consisting of the file system call '15' could match any of the following fragments: 15-*-*-*-*-*-*-*-*-*, *, *-15-*-*-*-*-*-*-*-*, *-*-15-*-*-*-*-*-*-*, *-*-*-15-*-*-*-*-*-*-*, *-*-*-*-15-*-*-*-*-*, *-*-*-*-*15-*-*-*-*, *-*-*-*, *-*-*-*-*-*-15-*-*-*, *-*-*-*-*-*-*-15-*-*, *-*-*-*-*-*-*-*-15-*, and *-*-*-*-*-*-*-*-*-15.

The combined use of these two detector-compression techniques (rule generation and chunking) may significantly bring down the number of detectors needed to cover non-self space from 10,239,999,990,000 to approximately 10,000. These techniques may also bring down the number of self-detectors needed to cover the entire self-space from about 10,000 to approximately 5,000. However, these detector quantities are typically still too large to manage for a thorough, fast, and lightweight MS solution on client device 106.

To further highlight the identified problem of which detectors to send to a client, assume that there are 350 detectors (either self or non-self), which are to be sent to the client. The 350 detectors are randomly selected from among the self or non-self space, respectively. Further, assume that the randomly selected detectors are of the 'uncompressed' variety. Also, assume that a malign or unauthorized process logs approximately 500 unique non-self fragments in a time span of 30 minutes. With these assumptions in the example, it follows that: If the 350 detectors were self-detectors, then approximately 9650 self-detectors would be left unsent. The sent detectors would cover approximately 3.5% of self-space. It is likely that non-self fragments logged would be detected with this scheme, but unfortunately, a benign or unhacked process may also have a significant fraction of logged fragments that do not fall within the 3.5% of self-space accessible. That is, the vast majority of benign processes may be considered 'malign', and the false positive rate would likely be intolerable.

Moreover, if the 350 detectors were non-self detectors, then approximately 1,023,999,989,650 non-self detectors would likely be left unsent. While these detectors would not notice benign processes (i.e. no false positives), they would also miss the vast majority of malign processes: in fact, less than 0.001% of the malign processes would be detectable.

Even if the two chunking algorithms disclosed above are employed, a lightweight solution consisting of sending randomly generated detectors (self or non-self) might be insufficient. The present invention targets these shortcomings of a typical AIS, providing a method for establishing a lightweight solution for successfully detecting the presence of malignly acting processes.

Description of a Machine-Learning Technique: the Genetic Algorithm

We now introduce the concept of a genetic algorithm, a machine-learning technique that the invention utilizes to better a given AIS system. Genetic Algorithms (GAs) are a subset of evolutionary algorithms (EAs). EAs use the concept of natural selection to evolve solutions, be they numerical solutions or conceptual solutions. They are often seen in engineering disciplines, and have started being used in many other fields, including biology, physics, and architecture.

Genetic Algorithms specifically focus on evolving numerical solutions to problems whose solution 'space' is too large to perform an exhaustive search over. In many of their applications, the number of possible numerical solutions to a given problem exceeds an available or allowed computational capacity. GAs address this quantity-of-solutions predicament by looking for good and sufficient solutions as opposed to a globally optimal solution. By allowing for this tradeoff, GAs greatly increase the speed of attaining solutions as well as the quality of the attained solutions, given a limited amount of time and processing capacity.

GAs use the concept of natural selection to accomplish this feat. Natural selection is the biological idea that there are many genetic variations in a population of a given species, and that a subset of this population is more adapted to its environment, and therefore has an advantage in its survivorship and fecundity. The frequency of positive genetic traits in the population therefore increases over generations. Variations in the population, on which natural selection can act, never cease to exist due to two genetic mechanisms: Mutation and recombination.

Mutation happens when a base pair (C, G, A, or T) in DNA changes to a different base pair, and that change is not repaired by the cell's machinery. Most of these changes are either deleterious, conferring a disadvantage to the recipient, or not felt at all, thereby giving the recipient neither an advantage nor a disadvantage. Sometimes, however, a mutation may cause a change in the DNA that confers an advantage to the individual, allowing him to interact more favorably with his environment.

Genetic recombination, or crossover, happens when diploid parental DNA breaks apart and re-anneals after a swap in neighboring DNA. This allows a child to receive some genetic aspects from both grandmothers as well as from both grandfathers. It allows for new combinations in the child's genetically determined traits.

Genetic Algorithms loosely incorporate these ideas of natural selection for use as a machine learning method. A random population of solutions is first created. These solutions are then ranked in accordance with how well they provide a solution to the given problem. This ranking is done, for example, via an established fitness function, which is analogous to a natural environmental pressure. The solution then gets to provide child solutions for the next generation based on how well it performed according to the fitness function. The better the solution is the more genetic material it gets to pass on to the next generation. The ideas of recombination and mutation may also be incorporated into the algorithm. When a parent solution creates offspring solutions, those offspring solutions are not exact replicas of the parent; they are slightly different depending on what portion of the solution was mutated in its passage to the next generation. Recombination is performed by breaking solutions and re-annealing them with other solutions, providing a mechanism for vastly new solutions to be generated.

Through iterated generations of mutation, recombination, and selection of solutions, the overall fitness of the population, as measured by the fitness function, increases. Genetic algorithms therefore may not generate solutions that are necessarily globally optimal, but they provide a fast and computationally expensive way to find solutions that are much better than the randomly selected initial solutions.

A Genetic Algorithm (GA)-Driven Detector-Evolving Mechanism

The present invention provides a genetic algorithm (GA) to generate detectors to match the most frequent fragments logged by an audited process. From previous studies, it has been seen that a malign software process may log hundreds of unique non-self sequences of file system calls. A substantial portion of these non-self fragments arises with high frequency. The AIS problem is that there are too many detectors, or 'solutions', to exhaustively check through, given the AIS's desired characteristics of being lightweight and fast. The GA applied to AIS would 'evolve' detectors that are capable of determining the benign or malign nature of the audited process.

Figure 3:
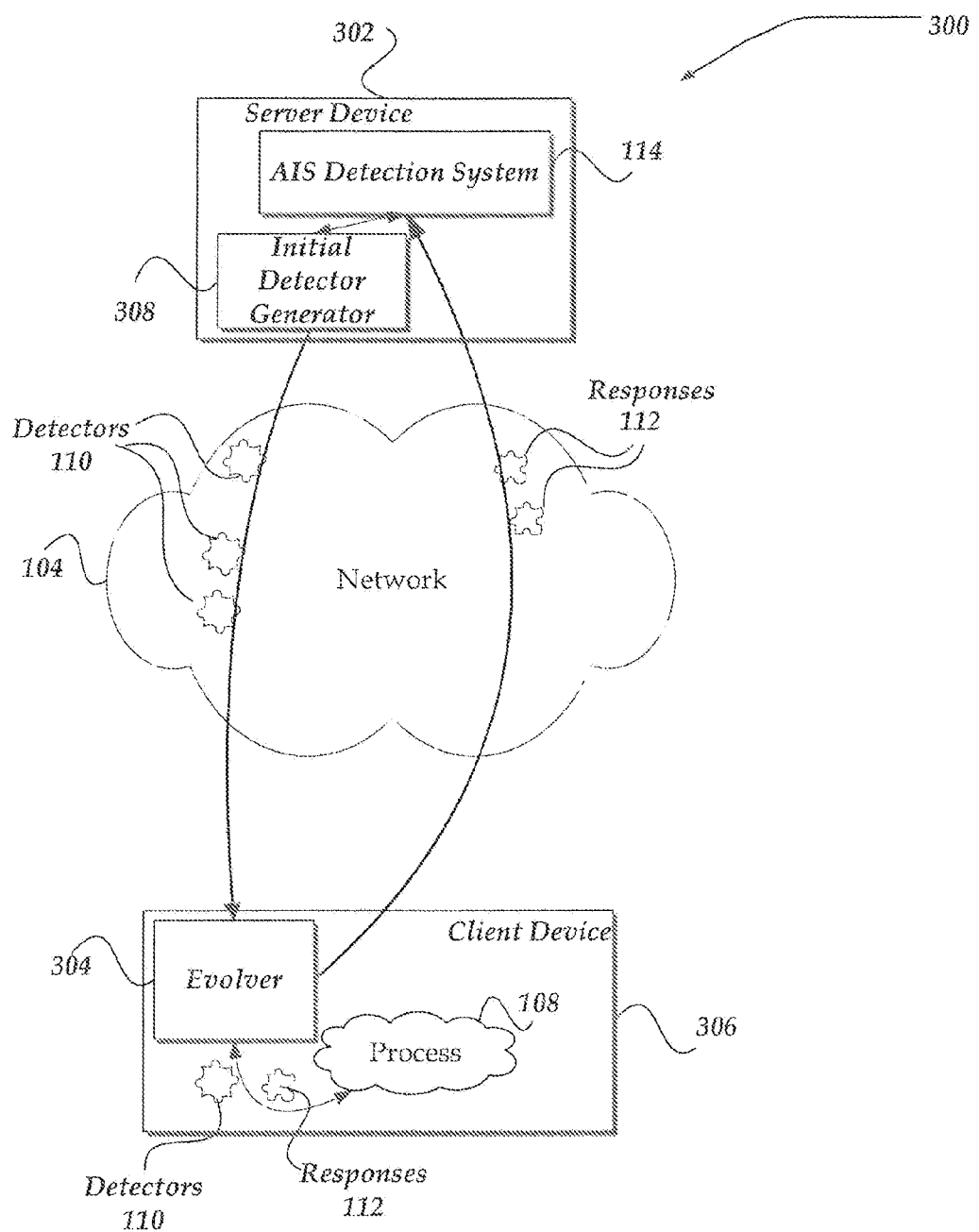
FIG. 3 shows a functional block diagram illustrating one operating environment with detectors evolving on the client-side via a genetic algorithm.

FIG. 3 is a functional block diagram illustrating one embodiment of an operating environment with client-side detectors evolving via a genetic algorithm, in accordance with the invention. Not all of these components may be required to practice the invention, and variations in the arrangement and type of the components may be made without departing from the spirit or scope of the invention.

As shown in FIG. 3, system 300 includes server device 302, network 104, and client device 306. Also shown, server device 302 includes AIS detection system 114 and initial detector generator 308. Client device 306 includes process 108 and GA-implemented detector evolver ("evolver") 304. AIS detection system 114 communicates through network 104 evolver 304.

Server device 302 is substantially similar to server device 102 of FIG. 1. Client device 306 is substantially similar to client device 106 of FIG. 1. Similarly, like components of FIGS. 1 and 3 (e.g., AIS detection system 114, process 108, and network 104) are labeled the same. Moreover, one embodiment of client device 306 is described in more detail below in conjunction with FIG. 4, while one embodiment of server device 302 is described in more detail below in conjunction with FIG. 5.

It is noted that while only a single client device 306 has been illustrated in FIG. 3, server device 302 may be connected to many more clients that are substantially similar to client device 306, without departing from the spirit or scope of the present invention.

Moreover, while initial detector generator 308 is illustrated within server device 302, the invention is not so limited. For example, initial detector generator 308 may also reside within client device 306, or even another network device (not shown), without departing from the scope or spirit of the invention.

Illustrative Client Device

Figure 4:
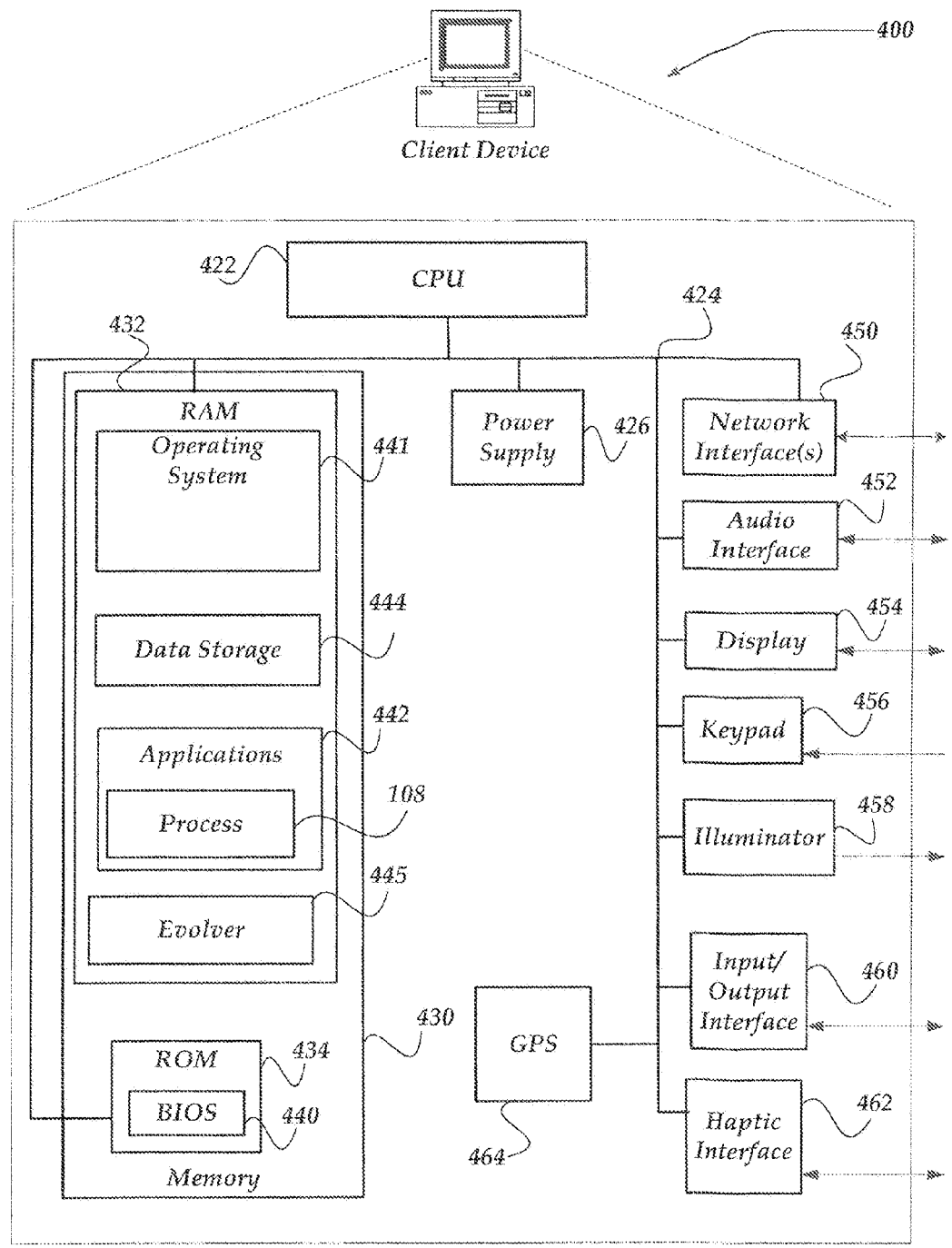
FIG. 4 shows one embodiment of a client device that may be included in a system implementing the invention.

FIG. 4 shows one embodiment of client device 400 that may be included in a system implementing the invention. Generally, client device 400 may comprise any personal electronic device. Oftentimes, electronic devices will be capable of personal communication by connecting to one or more wired and/or wireless networks, connecting to multiple nodes of a single wired and/or wireless network, communicating over one or more channels to one or more networks, or otherwise engaging in one or more communication sessions. Client device 400 may, for example, comprise electronic devices such as Personal Digital Assistants (PDAs), handheld computers, personal computers, multiprocessor systems, microprocessor-based or programmable consumer electronics, network PCs, wearable computers, or the like. Client device 400 may also comprise a server device.

Client device 400 may include many more or less components than those shown in FIG. 4. However, the components shown are sufficient to disclose an illustrative embodiment for practicing the present invention. As shown in the figure, client device 400 includes a processing unit 422 in communication with a mass memory 430 via a bus 424.

Client device 400 also includes a power supply 426, one or more network interfaces 450, an audio interface 452, a display 454, a keypad 456, an illuminator 458, an input/output, interface 460, a haptic interface 462, and an optional global positioning systems (GPS) receiver 464. Power supply 426 provides power to client device 400. A rechargeable or non-rechargeable battery may be used to provide power. The power may also be provided by an external power source, such as an AC adapter or a powered docking cradle that supplements and/or recharges a battery.

Client device 400 may optionally communicate with a base station (not shown), or directly with another computing device. Network interface 450 includes circuitry for coupling client device 400 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like. Network interface 450 is sometimes known as a transceiver, transceiving device, or network interface card (NIC).

Audio interface 452 is arranged to produce and receive audio signals such as the sound of a human voice. For example, audio interface 452 may be coupled to a speaker and microphone (not shown) to enable telecommunication with others and/or generate an audio acknowledgement for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may provide a status indication and/or provide light. Illuminator 458 may remain active for specific periods of time or in response to events. For example, when illuminator 458 is active, it may backlight the buttons on keypad 456 and stay on while the client device is powered. Also, illuminator 458 may backlight these buttons in various patterns when particular actions are performed, such as dialing another client device. Illuminator 458 may also cause light sources positioned within a transparent or translucent case of the client device to illuminate in response to actions.

Client device 400 also comprises input/output interface 460 for communicating with external devices, such as a headset, or other input or output devices not shown in FIG. 4. Input/output interface 460 can utilize one or more communication technologies, such as USB, infrared, Bluetooth™, or the like. Haptic interface 462 is arranged to provide tactile feedback to a user of the client device. For example, the haptic interface may be employed to vibrate client device 400 in a particular way when another user of a computing device is calling.

Optional GPS transceiver 464 can determine the physical coordinates of client device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS or the like, to further determine the physical location of client device 400 on the surface of the Earth. It is understood that under different conditions, GPS transceiver 464 can determine a physical location within millimeters for client device 400; and in other cases, the determined physical location may be less precise, such as within a meter or significantly greater distances.

Mass memory 430 includes a RAM 432, a ROM 434, and other storage means. Mass memory 430 illustrates another example of computer storage media for storage of information such as computer readable instructions, data structures, program modules or other data. Mass memory 430 stores a basic input/output system ("BIOS") 440 for controlling low-level operation of client device 400. The mass memory also stores an operating system 441 for controlling the operation of client device 400. It will be appreciated that this component may include a general purpose operating system such as a version of UNIX, or LINUX™, or a specialized client communication operating system such as Windows Mobile™, or the Symbian operating system. The operating system may include, or interface with a Java virtual machine module that enables control of hardware components and/or operating system operations via Java application programs.

Memory 430 further includes one or more data storage 444, which can be utilized by client device 400 to store, among other things, applications 442 and/or other data. For example, data storage 444 may also be employed to store information that describes various capabilities of client device 400. The information may then be provided to another device based on any of a variety of events, including being sent as part of a header during a communication, sent upon request, or the like.

Applications 442 may include computer executable instructions which, when executed by client device 400, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOID applications, contact managers, task managers, transcoders, database programs, word processing programs, security applications, spreadsheet programs, games, video players, multimedia players, and so forth. Any one or more of applications 442 may represent process 108 that is to be evaluated. Moreover, process 108 may also include one or more components of operating system 441, and/or firmware or the like, within any of the other components of client device 400. Thus, although process 108 is illustrated within applications 442, the invention is not so limited.

In addition, mass memory 430 stores evolver 445. Evolver 445 is described in more detail below. Briefly, however evolver 445 is configured to evolve and/or generate detectors as described below. As detectors are employed to perform matches, responses may be provided to an AIS detection system for evaluation of unauthorized activities. In one embodiment, the responses are detectors that satisfy a particular criterion.

Illustrative Server Environment

Figure 5:
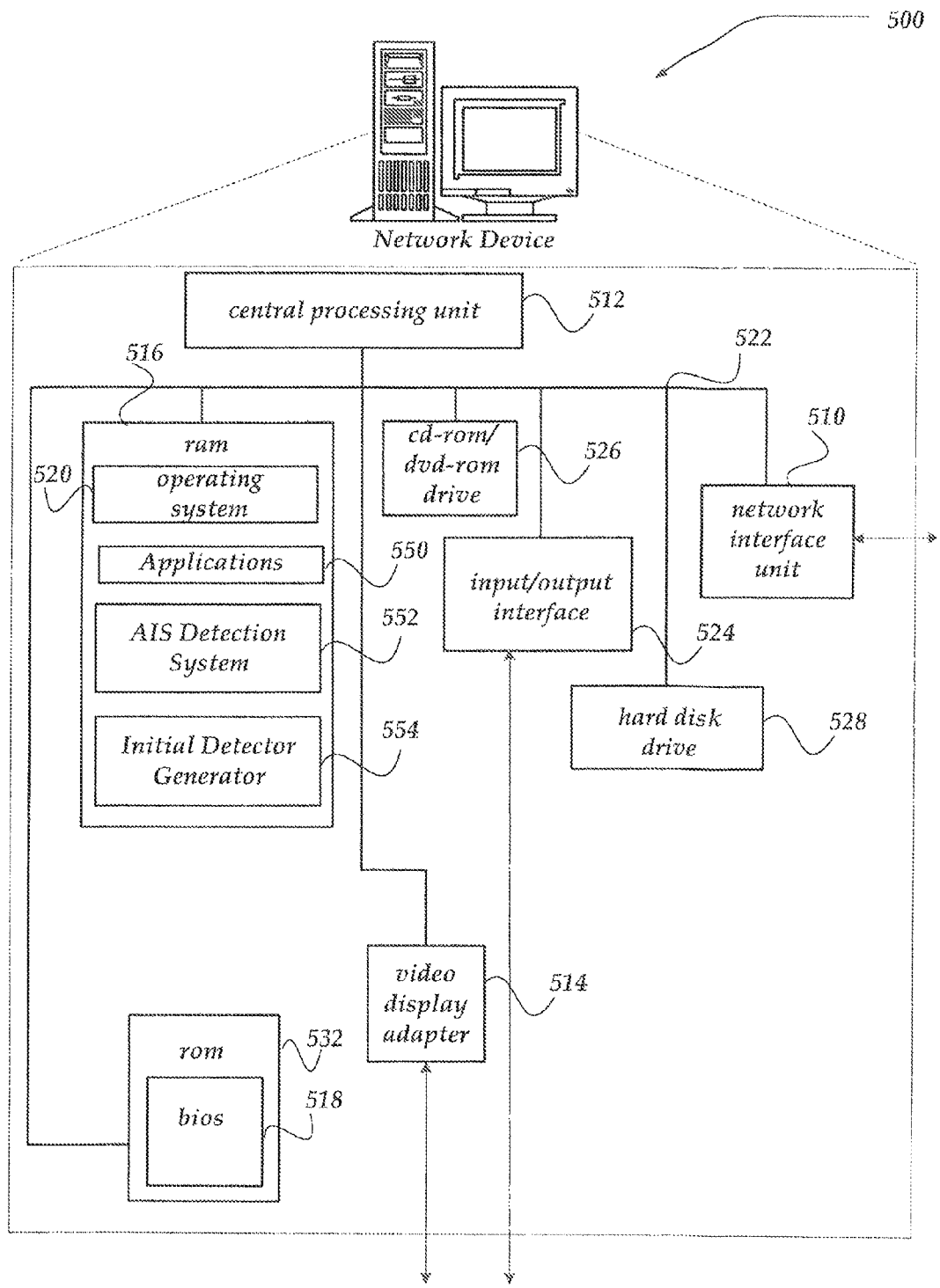
FIG. 5 shows a functional block diagram illustrating one embodiment of a server device that may be included in a system implementing the invention.

FIG. 5 shows one embodiment of a network device, according to one embodiment of the invention. Network device 500 may include many more components than those shown. The components shown, however, are sufficient to disclose an illustrative embodiment for practicing the invention. Network device 500 may represent, for example, server device 102 of FIG. 1.

Network device 500 includes processing unit 512, video display adapter 514, and a mass memory, all in communication with each other via bus 522. The mass memory generally includes RAM 516, ROM 532, and one or more permanent mass storage devices, such as hard disk drive 528, tape drive, optical drive, and/or floppy disk drive. The mass memory stores operating system 520 for controlling the operation of network device 500. Any general-purpose operating system may be employed. Basic input/output system ("BIOS") 518 is also provided for controlling the low-level operation of network device 500. As illustrated in FIG. 5, network device 500 also can communicate with the Internet, or some other communications network, via network interface unit 510, which is constructed for use with various communication protocols including the TCP/IP protocol. Network interface unit 510 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Network device 500 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 500 may further include applications that support virtually any secure connection, including but not limited to TLS, TTLS, EAP, SSL, IPSec, and the like. Similarly, network device 500 may include applications that support virtually any tunneling mechanism, including but not limited to VPN, PPP, L2TP, and the like.

Network device 500 also includes input/output interface 524 for communicating with external devices, such as a mouse, keyboard, scanner, or other input devices not shown in FIG. 5. Likewise, network device 500 may further include additional mass storage facilities such as CD-ROM/DVD-ROM drive 526 and hard disk drive 528. Hard disk drive 528 may be utilized to store, among other things, application programs, databases, client configuration information, or the like.

The mass memory also stores program code and data. One or more applications 550 are loaded into mass memory and run on operating system 520. Examples of application programs may include transcoders, schedulers, calendars, database programs, word processing programs, HTTP programs, customizable user interface programs, administration applications, encryption programs, security programs, media streaming programs, and so forth. Mass storage may further include applications such as AIS detection system 552, and initial detector generator 554. AIS detection system 552 is substantially similar to the AIS detection system 114 described above. Moreover, initial detector generator 554 is configured to generate one or more detectors, and to provide those detectors for use in evaluating a process for unauthorized activity as described in more detail below.

Generalized Operation

Figure 8:
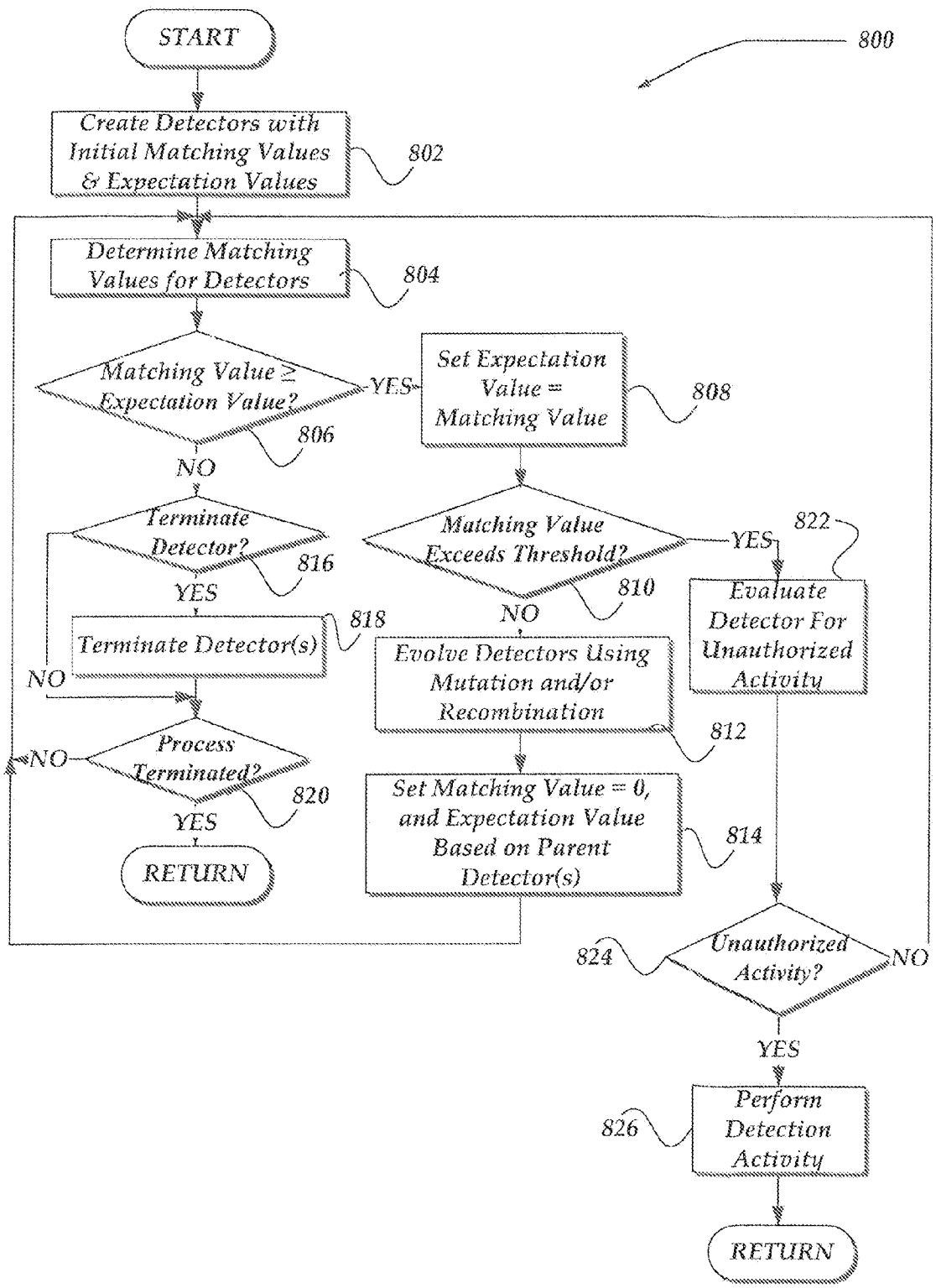
FIG. 8 illustrates a logical flow diagram generally showing one embodiment of a process of evolving detectors in an AIS for detecting unauthorized computing activities, in accordance with the invention.

The operation of certain aspects of the invention will now be described with respect to FIG. 8. FIG. 8 illustrates a logical flow diagram generally showing one embodiment of a process of evolving detectors in an AIS for detecting an unauthorized computing activity. Actions of process 800 of FIG. 8 may be implemented, in one embodiment, within client device 306 and server device 302 of FIG. 3.

Process 800 begins, after a start block, at block 802, where an initial population of detectors is generated. The initial population may be of virtually any number of detectors, based on knowledge of the process being evaluated, engineering judgment, suspected unauthorized activities, knowledge of the client device, or any of a variety of other factors. In one embodiment, a typical initial population size may range between 100-600 detectors. However, other sizes may be also generated.

Each detector within the initial population of detectors may be randomly generated, or generated in a directed manner through the use of additional information such as specific patterns to look for in the audited process. In one embodiment, at least one detector may be randomly generated, while at least another detector may be generated based on a known pattern. However, the invention is not so constrained, and virtually any other combination or other criteria, may be employed in the generation of the initial population of detectors.

Moreover, at block 802, each generated detector may be initialized with a matching value of zero and an expectation value of zero. The matching value represents the highest matching percentage between the client-side logged software process fragments and the detector, while the expectation value designates the percent matching value to be exceeded in order for detector reproduction to occur. Once the initial detectors have been created, they may be communicated to the client device that is being evaluated for malign or unauthorized behavior.

Processing thus, flows next to block 804, where a comparison is performed between each detector and computer system call fragments associated with the process being evaluated. Each detector's matching value is recomputed as a result of this comparison. For example, given a detector fragment of length 10, if 1/10 of the file system calls between the audited fragment and the detector are the same, then the detector's new matching value might be 10%; if 2/10, then the new matching value might be set to 20%, and similarly, up to 100% for an exact match. However, the invention is not constrained to this example, and other values may be chosen for setting a detector's matching value, without departing from the spirit or scope of the invention.

Processing continues to decision block 806, where a determination is made whether the revised or recomputed matching value for each detector is equal to or exceeds that detector's expectation value. In a first round through process 800, this would be the case. In any event, if the matching value is less than the expectation value, processing flows to decision block 816. Otherwise, if the matching value does equal or exceed the expectation value, then processing flows to block 808, where that detector is given the recomputed matching value as its new expectation value. Processing then continues to decision block 810, where a determination is made whether the matching value for a detector exceeds a threshold value.

A pseudo-generational cycle may continue throughout the executing life of the process being evaluated, where a detector performs a hill-climbing with respect to its matching value, while the detector's matching value is anticipated to climb to a threshold value. In one embodiment, the threshold value may be a fragment match of 100%. However, other threshold values may also be selected. For example, in one embodiment, a 98% match, or the like, may also be selected. In any event, if at decision block 810, the detector's matching value does exceed (or satisfy) the threshold value, processing flows to block 822. In one embodiment, block 822 may be performed remote from the client device, to avoid tampering of the detection activity.

In any event, at block 822, the detector is evaluated against the self database to determine its self or non-self status, e.g., normal or abnormal functioning of the audited process, respectively. Processing flows next to decision block 824, where a determination is made whether unauthorized activity is detected. If so, processing flows to block 826; otherwise, processing may loop back to block 804 to continue hill-climbing of other detectors, or termination of process 800.

At block 826, any of a variety of detection responses may be performed, including, but not limited to sending an alert message, inhibited sending of information to the client device, sending an instruction or the like to the client device to inhibit further actions by the process being audited, or the like. Upon completion of block 826, process 800 may return to a calling process to perform other actions.

At decision block 810, however, if the matching value does not exceed the threshold, processing may flow to block 812, where detectors are evolved.

Detector evolution has several properties. First, the number of children detectors generated by a detector may be proportional to the detector's matching value: the higher the matching value, the more children it may be allowed to have. This weighting may be used to adjust for the smaller likelihood of evolving into a higher percentage match if the matching value is already high. Second, the mutation rate may be detector specific, with higher mutation rates corresponding to lower matching values for the same probability reasons.

Figure 6:
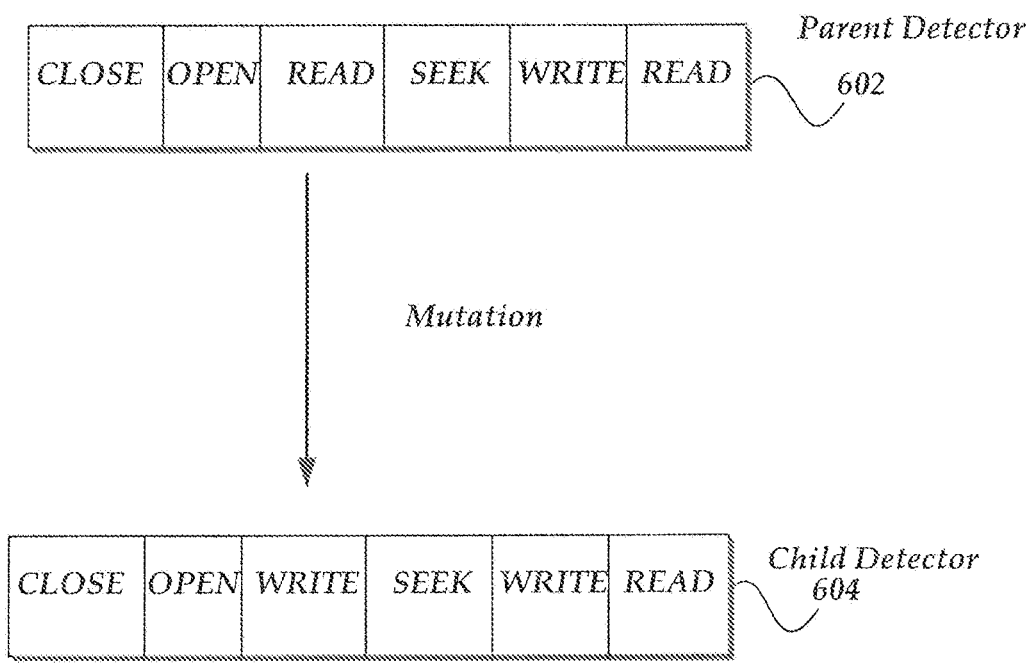
FIG. 6 is a diagram illustrating one embodiment of mutation applied to a detector.

FIG. 6 shows one embodiment of a parent detector undergoing mutation in order to generate a mutated detector child. In this example, the child detector 604 is in every way identical to the parent detector 602, except that its third file system call is 'WRITE' instead of the parental 'READ'. However, it should be clear that any of a variety of other mutations may occur. For example, in one embodiment, a child detector may also grow its fragment length, reduce its fragment length, and/or change more than one system calls, without departing from the scope of the invention. In is therefore apparent that variation in the population is kept or generated.

Figure 7:
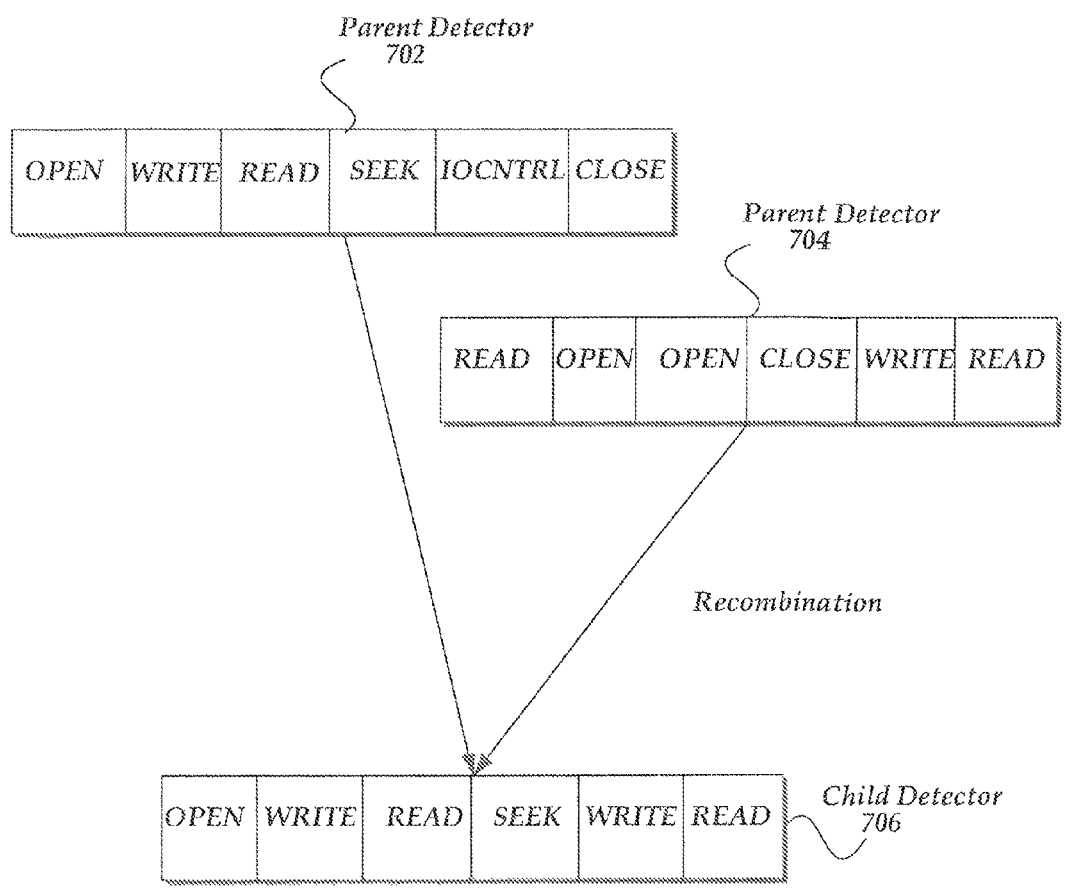
FIG. 7 is a diagram illustrating one embodiment of recombination between two detectors, in order to create a child detector.

Third, the recombination rate is either zero, or a speciation GA may be implemented in which meta-populations of evolving detectors are recombined. FIG. 7 is a diagram illustrating one embodiment of recombination between two detectors, in order to create a child detector. As seen in the example, the first four file system calls of child detector 706 come from parent detector 702, while the last two file system calls come from parent detector 704. However, it should be clear that any of a variety of other combinations may be performed during combining of parent detectors to generate or evolve a child detector. Thus, in one embodiment, a child detector may evolve from more than two parent detectors, different segments of parent detectors, or the like.

In any event, upon generation of detector children, processing moves from block 812 of FIG. 8 to block 814, where each child detector is given initial matching values of zero, and their expectation values are inherited from their parent detectors. In one embodiment, the expectation value may be the same as the parent's expectation value. In another embodiment, where the child is evolved from more than one parent, the child's expectation value may be a combination of the parent's expectation values, such as a mean value, or the like. In any event, processing then loops back to block 804.

As shown in process 800, the children detectors constitute a new population of detectors to be compared to the audited process fragments. In one embodiment, the next time a process fragment is logged, all of the detectors have their matching values reevaluated, at block 804. When a parent detector has its expectation value equaled or exceeded, that detector is again allowed to replicate, at block 812; if its children have their expectation values equaled or exceeded, they are also allowed to replicate, at block 812.

However, as shown in process 800, if at decision block 806, the detector's matching value does not exceed its expectation value, processing flows to decision block 816. At decision block 816, a determination is made whether to delete the detector. A detector may be deleted based on failure to satisfy the test at decision block 816, or any of a variety of other criteria, including, for example, whether the detector has exceeded a time limit, or the like. In any event, if the detector is to be deleted, processing flows to block 818 where the detector is deleted. Processing then flows to decision block 820. If the detector is not to be deleted, processing also flows to decision block 820.

At decision block 820, a determination is made whether the process being evaluated is terminated. If so, process 800 may return to the calling process to perform other actions; otherwise, process 800 may loop back to block 804, to continue evolving detectors, and hill-climbing with respect to a detector's matching value, until process 800 is concluded.

As may be seen, the invention maintains the lightweight nature of an AIS system, while greatly increasing its ability to detect malign hacks or other unauthorized activities given about the same detector population size. The present invention further covers fragment space intelligently. It may also evolve more quickly to frequently seen fragments, whether normal or abnormal. This behavior of the invention is directed towards producing fewer false positives than other AIS embodiments that may not contain a detector-evolving algorithm. The invention may also be implemented to minimize communication between the server device 302 and the client device 306 over the network 104 of FIG. 3, thereby strengthening the security of the AIS.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A network device for detecting an unauthorized activity by another network device, comprising:
    a transceiver that is configured to communicate over a network;
    a memory that is configured to store instructions; and
    a processor that is configured to execute instructions that enable actions, including:
        generating a plurality of detectors, wherein each detector includes a plurality of system calls;
        determining an initial matching value and an expectation value for each detector;
        comparing each detector to logged fragments of system calls that are associated with a computing process, and employing at least in part the comparison to determine a new matching value for each detector;
        when the new matching value for at least one detector is equal to or greater than the at least one detector's expectation value, evolving a child detector from the at least one parent detector;
        generating a value for the child detector that is based on a combination of common values from a plurality of detectors that are employed to evolve the child detector;
        associating a rate of mutation for each detector that corresponds to mutations in its evolved child detectors; and
        enabling a mutation in at least one child detector, wherein the mutation includes a change from a corresponding parent detector for at least one of a fragment length for each system call and a type of each system call.

2. The network device of claim 1, wherein generating the detector further comprises at least one action of:
    randomly generating the detector; and
    employing at least one pattern of system calls associated with the computing process to generate the detector.

3. The network device of claim 1, further comprising the action of determining for each detector at least one of: an amount of corresponding child detectors, and a rate for evolving child detectors.

4. The network device of claim 1, further comprising the action of modifying the parent detector's expectation value based on at least a copy of the parent detector and at least one mutation.

5. The network device of claim 1, further comprising the action of modifying at least one child detector's expectation value and the new matching value based on another comparison to the logged fragments of the system calls.

6. The network device of claim 1, further comprising the action of when one expectation value for the detector or at least one of its corresponding child detectors exceeds a threshold value, evaluating the detector to determine when unauthorized activity is detected at the other network device.

7. A method for detecting an unauthorized activity at a network device, comprising the actions of enabling a processor to execute instructions that enable further actions, including:
    generating a plurality of detectors, wherein each detector includes a plurality of system calls;
    determining an initial matching value and an expectation value for each detector;
    comparing each detector to logged fragments of system calls that are associated with a computing process, and employing at least in part the comparison to determine a new matching value for each detector;
    when the new matching value for at least one detector is equal to or greater than the at least one detector's expectation value, evolving a child detector from the at least one parent detector;
    generating a value for the child detector that is based on a combination of common values from a plurality of detectors that are employed to evolve the child detector;
    associating a rate of mutation for each detector that corresponds to mutations in its evolved child detectors; and
    enabling a mutation in at least one child detector, wherein the mutation includes a change from a corresponding parent detector for at least one of a fragment length for each system call and a type of each system call.

8. The method of claim 7, wherein generating the detector further comprises at least one action of:
    randomly generating the detector; and
    employing at least one pattern of system calls associated with the computing process to generate the detector.

9. The method of claim 7, further comprising the action of determining for each detector at least one of: an amount of corresponding child detectors, and a rate for evolving child detectors.

10. A non-transitive processor readable storage media that includes data and instructions, wherein execution of the instructions by a processor enables actions for detecting an unauthorized activity at a network device, the actions include:
    generating a plurality of detectors, wherein each detector includes a plurality of system calls;
    determining an initial matching value and an expectation value for each detector;
    comparing each detector to logged fragments of system calls that are associated with a computing process, and employing at least in part the comparison to determine a new matching value for each detector;
    when the new matching value for at least one detector is equal to or greater than the at least one detector's expectation value, evolving a child detector from the at least one parent detector;
    generating a value for the child detector that is based on a combination of common values from a plurality of detectors that are employed to evolve the child detector associating a rate of mutation for each detector that corresponds to mutations in its evolved child detectors; and
    enabling a mutation in at least one child detector, wherein the mutation includes a change from a corresponding parent detector for at least one of a fragment length for each system call and a type of each system call.

11. The media of claim 10, wherein generating the detector further comprises at least one action of:
    randomly generating the detector; and
    employing at least one pattern of system calls associated with the computing process to generate the detector.

12. The media of claim 10, further comprising the action of determining for each detector at least one of: an amount of corresponding child detectors, and a rate for evolving child detectors.

13. A system for detecting an unauthorized computing activity, comprising:
   a server device that is configured to perform actions, including:
      generating a plurality of detectors, wherein each detector includes a plurality of system calls;
      determining an initial matching value and an expectation value for each detector;
      sending the plurality of detectors over a network to at least one client device;
      generating a value for the child detector that is based on a combination of common values from a plurality of detectors that are employed to evolve the child detector;
      associating a rate of mutation for each detector that corresponds to mutations in its evolved child detectors; and
      enabling a mutation in at least one child detector, wherein the mutation includes a change from a corresponding parent detector for at least one of a fragment length for each system call and a type of each system call; and
   a client device that is configured to perform actions, including:
      receiving the plurality of detectors;
      comparing each detector to logged fragments of system calls that are associated with a computing process, and employing at least in part the comparison to determine a new matching value for each detector; and
      when the new matching value for at least one detector is equal to or greater than the at least one detector's expectation value, evolving a child detector from the at least one parent detector.

14. The system of claim 13, wherein generating the detector further comprises at least one action of:
   randomly generating the detector; and
   employing at least one pattern of system calls associated with the computing process to generate the detector.

15. The system of claim 13, further comprising the action by the server device of determining for each detector at least one of: an amount of corresponding child detectors, and a rate for evolving child detectors.

* * * * *